United States Patent [19]
Leslie

[11] Patent Number: 5,224,443
[45] Date of Patent: Jul. 6, 1993

[54] FLOOR MOUNTED ANIMAL FEEDING APPARATUS

[75] Inventor: Norman F. Leslie, Big Lake, Minn.

[73] Assignee: Cargill, Incorporated, Minneapolis, Minn.

[21] Appl. No.: 940,078

[22] Filed: Sep. 3, 1992

[51] Int. Cl.$^5$ ............................ A01K 1/02; A01K 5/01
[52] U.S. Cl. ........................................ 119/20; 119/61
[58] Field of Search ...................... 119/18, 20, 51.5, 61

[56] References Cited

U.S. PATENT DOCUMENTS

| | | | |
|---|---|---|---|
| 1,116,376 | 11/1914 | Bohlander | 119/61 |
| 2,254,585 | 9/1941 | Travis | 119/61 X |
| 4,546,730 | 10/1985 | Holland | 119/61 X |

FOREIGN PATENT DOCUMENTS 2099275 12/1982 United Kingdom ............... 119/61

OTHER PUBLICATIONS

Advertisement, dated Apr. 1991, for Brookvue Farms Equipment ACO advertising an "AD-Lib Feeder" made by ACO Polymer Products Ltd.
Advertisement for Hollam Swine Systems, Inc. advertising a "Hollam Nursery Pen". Date unknown.

*Primary Examiner*—Robert P. Swiatek
*Attorney, Agent, or Firm*—Fitch, Even, Tabin & Flannery

[57] ABSTRACT

A feeder for animals including a substantially concave food reservoir, supported by a base, which is manually attached to a slotted or mesh floor by a spring-biased hook. The hook is manually extended below the surface of the floor through an aperture, and is manually reoriented to engage the floor as the potential of the spring is released. An upper end of the spring-biased hook is slidably and rotatably guided by a guide tube supported by a plurality of separator bars extending from the guide tube to the perimeter of the food reservoir.

13 Claims, 3 Drawing Sheets

FLOOR MOUNTED ANIMAL FEEDING APPARATUS

BACKGROUND OF THE INVENTION

The invention relates generally to animal feeders, and, more particularly, to ad-lib animal feeders.

It is often desirable to provide an on-demand supply of food for animals. Consequently, a goal of design in animal feeders has been to increase accessibility of food to the animals and to maintain a constant supply of food so that the animals are able to eat at all times. In order to meet this goal, it is important to incorporate design features which increase general access to the food, which reduce food wastage, and which facilitate cleaning the feeders and the animal pens containing the feeders.

One type of currently available feeder is an enclosed, food holding bin, positioned over a trough which attaches firmly on or under a pen wall or divider panel. One shortcoming of such wall-mounted feeders is the difficulty of attaching and detaching them from the walls or divider panels. Whenever a pen is to be cleaned or merely rearranged, stock tending personnel must detach the wall mounted feeder and reattach it on completion of this task. Given the substantial attachment of the feeders to the pen walls, such detachment and reattachment requires significant time and energy.

Another limitation of feeders that attach to a wall or divider panel is that they permit feeding from one direction only. Thus, only a small number of animals may feed from a particular feeder at one time. Furthermore, because they are enclosed, the feeding stations are dimly lit inside despite the aperture for the animal's head. Animals may consequently be intimidated by such closed troughs, discouraging consumption. These troughs additionally tend to have an excess of food storage and require only infrequent food additions. More frequent food additions are desirable to insure fresher food for the animals. The combination of darkness and excess storage also accounts for the considerable food wastage generally associated with their use.

Unattached pans or feeding boards have also been used to provide ad-lib feeding to animals. These devices exhibit additional problems. Animals tend to move or even overturn the unattached pans or feeding boards when eating, resulting in significant food wastage and, consequently, times when food is not being presented to the animals.

The problem of providing continuous on-demand feeding for animals demands greater access to food, increased ease of positioning and cleaning, and reduced wastage of food.

SUMMARY OF THE INVENTION

In accordance with the present invention, there is provided a feeder for animals which encourages ad-lib consumption of food, permits 360° access to food, is easy to position within the pen, requires no attachment to a pen divider panel or a wall, is easy to clean and refill, and reduces food wastage. The feeder comprises a food reservoir having means for attaching to the pen floor so as to permit feeding as the reservoir is approached from any angle.

In accordance with a preferred embodiment of the invention, the animal feeder is used for feeding pigs, which are often raised in pens with slotted floors. Slotted floors are frequently used in animal pens, particularly pig pens, because they facilitate washing away spilled food and animal excrement. A slotted floor consists of a plurality of floor support members, such as rods, which are separated by spaces called slots. The floor support members which comprise the slotted floor are sufficiently closely spaced to allow the animals to walk on the floor without difficulty but define slots therebetween which are sufficient in size to allow food and excrement to fall through. The feeder comprises a food reservoir and an attached, movable hook which is manually pressed down between the support members of a slotted floor against the bias of a spring. The hook is then reoriented to engage one or more of the floor support members as the compressed spring drives the hook upwardly. Spring bias of the hook maintains forced attachment between the feeder and the floor, obviating attachment to a pen divider. To detach the feeder, one exerts downward pressure to disengage the hook from the floor support members, reorients the direction of the hook to a position which is free of floor members, and releases the downward pressure.

Advantageously, the feeder comprises a substantially concave food reservoir which permits access to the food as an animal approaches the feeder from any direction. Separator bars, which emanate from a central location above the food reservoir to points on the perimeter of the food reservoir, define feeding positions. The separator bars increase smaller animals' access to the food by limiting the range of intimidating motion of the larger or more aggressive animals as they eat. Furthermore, the separator bars do not obstruct light in the feeder, providing the animals easier access to the food and a less intimidating environment than the solid separators of panel divider troughs. The separator bars may also be used to support the upper end of a centrally mounted tube which supports and guides the mounting hook in its upward and downward movement.

The open, substantially concave food reservoir creates relatively even distribution of food within the reservoir. In the trough-shaped food reservoirs of prior feeders, the supply of food which is consumed on one end of the reservoir is not readily replenished by excess food on the other end. In the preferred embodiment, the reservoir comprises a substantially spherical section and the concavity of the food reservoir permits gravity to keep the food centrally located and accessible from all feeding positions until the entire food supply is exhausted.

The detachability of the feeder and the open design of the feeding reservoir make the preferred embodiment particularly simple to clean and refill. Because the attachment hook can be readily disengaged from the attachment arrangement, such as is provided by the slotted floor, the feeder is easily moved for cleaning or refilling.

DETAILED DESCRIPTION OF THE PREFERRED EMBODIMENT

Figure 1:
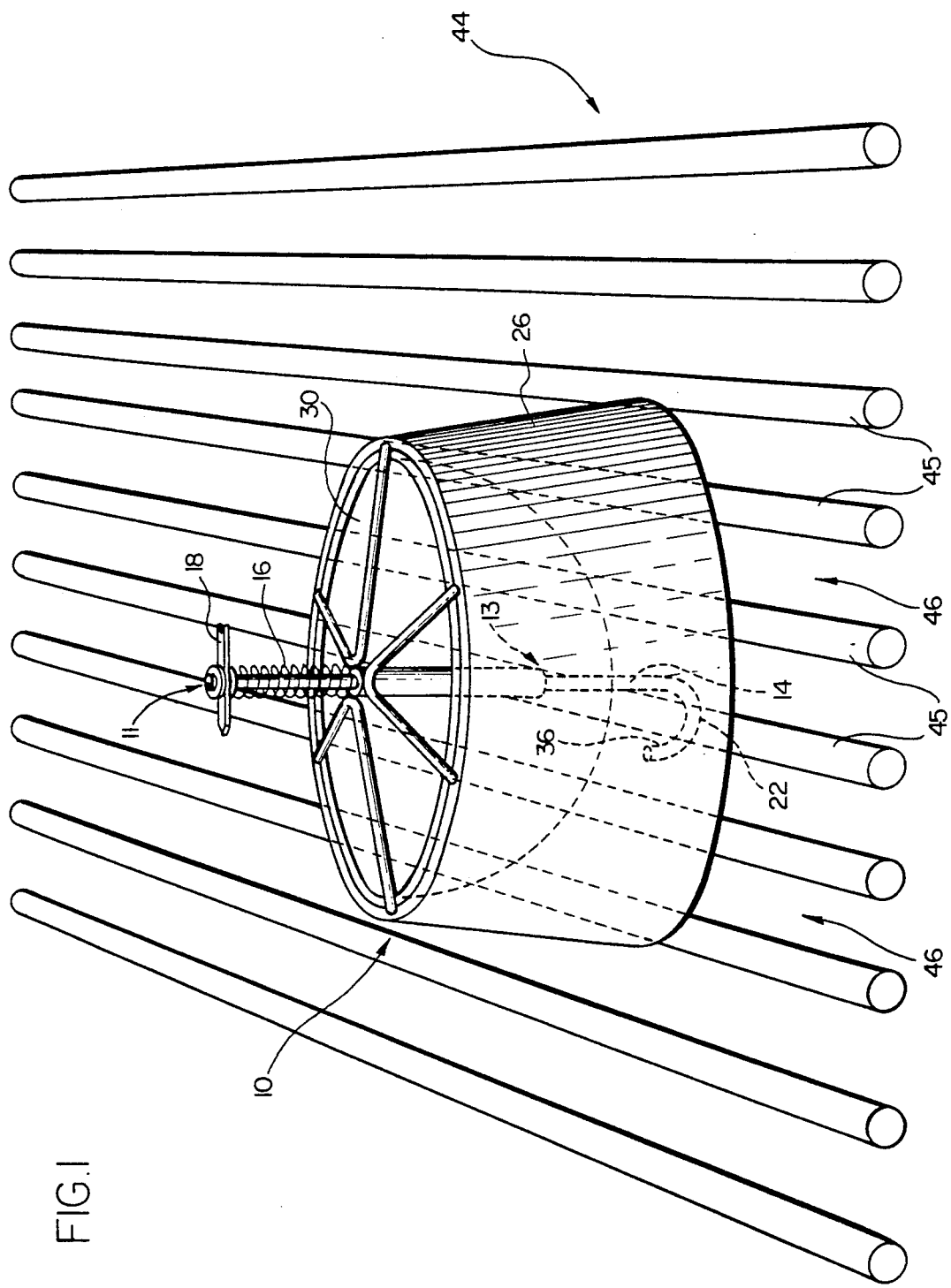
FIG. 1 is a perspective view of an animal feeder engaged with a slotted floor.

An animal feeder 10 in accordance with the preferred embodiment is shown in FIG. 1 and comprises an open, upwardly facing, concave food reservoir 30, shaped as a substantially spherical section. The food reservoir 30 is supported above a slotted floor 44 by a base 26 subtending from the perimeter of the reservoir 30.

In FIG. 1, slotted floor 44 is shown comprising a plurality of parallel floor support members or rods 45 having spaces or slots 46 therebetween. The slots 46 between rods 45 are shown larger than normal for ease of understanding the interrelationships of the parts of the apparatus. It should be mentioned that other types of slotted floors can be used with the feeder described herein without departing from the present invention. Many such slotted floors are known in the art. For example, the slotted floor may include rods (not shown) running perpendicular to the rods 45, to provide a floor with greater structural support than is provided by parallel rods 45 alone.

Feeder 10 includes a spring-biased hook assembly 11 for attaching the feeder to the slotted floor. Hook assembly 11 comprises a shaft 14, which is disposed along a central axis of reservoir 30 and passes through an aperture 13 at the lowest point of reservoir 30. The lower end of shaft 14 is formed into a hook 22 for engaging the rods 45 of floor 44. The shaft 14 is rotatably attached to the feeder so that an engagement opening 36 of hook 22 can be oriented parallel to the slots 46, then rotated with respect to the feeder and the slots, into a position perpendicular to the slots 46. Orientation of the hook perpendicular to the slots 46 permits the attachment of the feeder 10 to one or more of the rods 45, as shown in FIG. 1.

Figure 2:
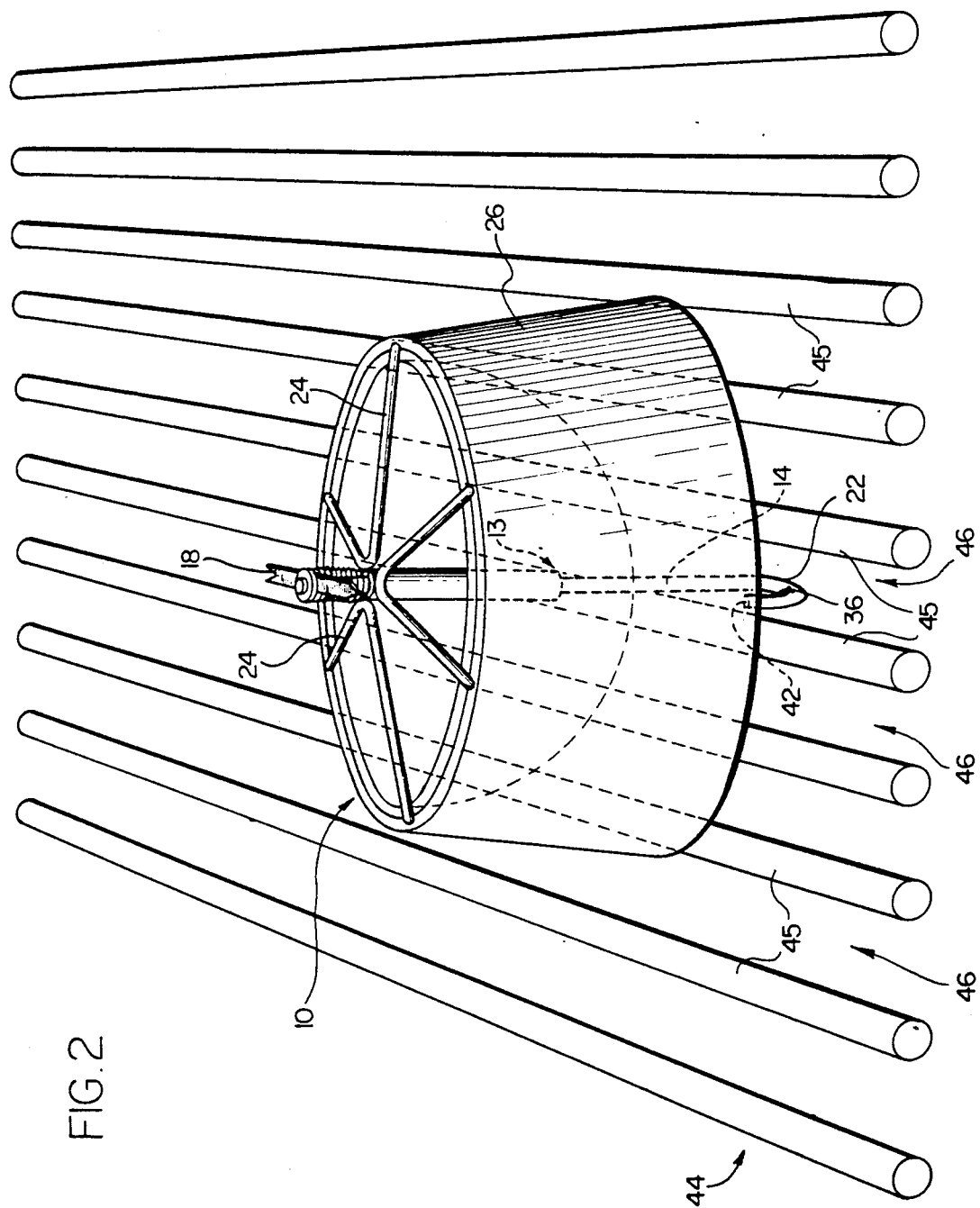
FIG. 2 is a perspective view of the animal feeder of FIG. 1 in intermediate position between fully engaged and fully disengaged with a slotted floor.

The feeder 10 can be placed on floor 44 and readily attached thereto by pushing shaft 14 down against the bias of a spring 16, while the hook opening 36 is parallel to the rods 45 (FIG. 2). When the tip 42 of hook 22 is below the rods 45, the shaft 14 is rotated to orient the opening 36 of hook 22 perpendicular to the rods 45, and the downward pressure on shaft 14 is released. The upward force applied to hook assembly 11 by the spring 16 maintains the feeder in attached relationship to the floor.

Detachment is achieved by a reverse of the attachment steps. First, the hook assembly 11 is pressed downward until the tip 42 of hook 22 is beneath the rods 45. The shaft 14 is then rotated until the hook opening 36 is in a space between rods 45 and the pressure is released, permitting the spring to draw the hook 22 upwardly against the bottom of reservoir 30. The feeder can then be moved for cleaning, or rearrangement of the animal pen. To simplify attachment and detachment of feeder 10, a pointer 18 is affixed to the top of shaft 14 to point out to the user the direction of hook opening 36.

Figure 3:
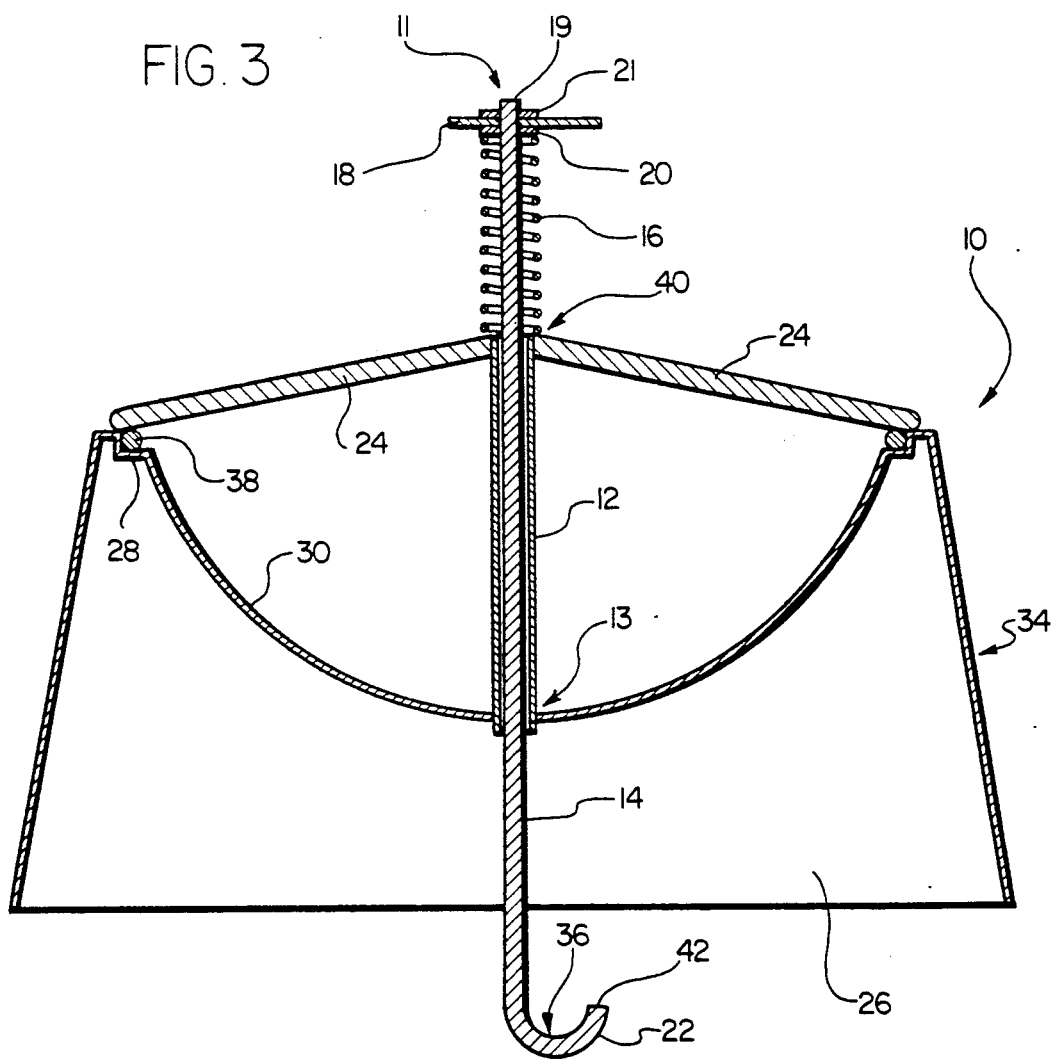
FIG. 3 is a cross-sectional view of the animal feeder in the plane of the hook.
Figure 4:
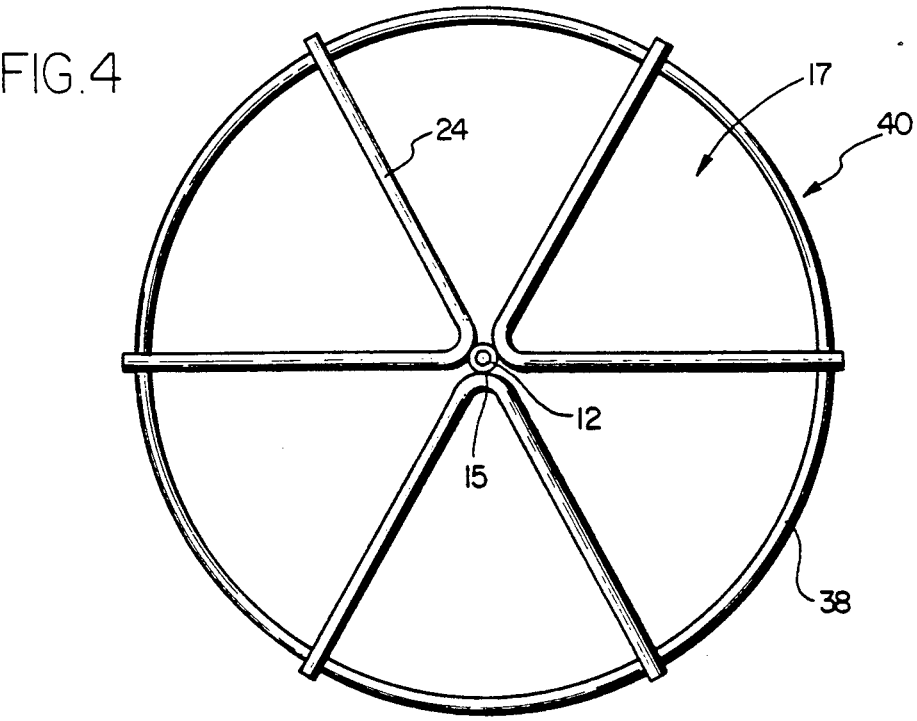
FIG. 4 is an elevated overhead view of the separator bars and guide tube of the animal feeder.

FIGS. 3 and 4 show the construction of feeder 10 in greater detail. As shown in FIG. 3, animal feeder 10 comprises a reservoir assembly 34, a hook/attachment assembly 11, and a support and separator assembly 40. Support and separator assembly 40, which is shown in top view in FIG. 4, comprises a guide tube 12, an outer ring 38 and a plurality of separator bars 24. A separator bar assembly 40 having six separator bars 24 is shown in the Figures. Although any number of separator bars could be used, four or more separator bars equally spaced around the perimeter is preferred. Ring 38 has a diameter substantially equal to the upper diameter of reservoir 30. Separator bars 24 are attached at one end to guide tube 12 and extend substantially radially therefrom, to attachment at ring 38. The bars 24 are equally spaced around ring 38 and guide tube 12, to provide uniform support to the top of guide tube 12 and to define a plurality of feeding positions 17. The bars 24 shown in FIG. 4 are fabricated in pairs using three bars, each bar bent into a substantially 60° V-shape. The apex of each V is then connected to the top of tube 12 and the free ends of the V's are connected to ring 38. In the embodiment, bars 24 are connected to tube 12 and to ring 38 by welding. Although separator bars 24 may be fabricated of any material capable of withstanding the stresses imposed, separator bars fabricated from a plastic such as polyester are preferred.

Guide tube 12 has a central aperture 15 running its length, and is sufficiently long to extend through aperture 13 at the lowest point of reservoir surface 30 when mated therewith as shown in FIG. 3. Advantageously, guide tube 12 and aperture 13 may be formed to provide a fluid-tight seal so that the reservoir is fluid-tight when guide tube 12 is in place, permitting wet food and liquids to be presented in the feeder without leakage.

Reservoir assembly 34 includes the reservoir 30 and side wall 26, which forms an open base for the feeder. A toroidal indentation 28 is formed around the upper perimeter of reservoir 30 to receive the ring 38 of the support assembly 40. Since the guide tube 12 is centrally disposed within ring 38, its lower end extends through the aperture 13 in the bottom of reservoir 30. Shaft 14, with hook 22 formed thereon, can be inserted up through the center of guide tube 12 and out the upper opening thereof. After shaft 14 is inserted through tube 12, coil spring 16 is placed thereover and a nut 20 is threaded onto a threaded portion 19 of shaft 14. A washer (not shown) may be placed between nut 20 and spring 16, to provide a large abutment with which to hold spring 16 in place. Pointer 18 is then placed on top of nut 20 and oriented to point in the direction of the open hook portion 36. In order to assure the proper orientation of pointer 18 with respect to hook 22, shaft 14 may be keyed with an aperture in pointer 18. After placement of pointer 18 on shaft 14, a nut 21 is threaded onto threaded portion 19.

Spring 16 is selected to have sufficient length to push shaft 14 upward and engage hook 22 with the bottom of reservoir 30 when not in use. In this way, the hook is pulled above the base opening defined by side wall 26 when it is not being forced down or held down by attachment of hook 22 to a floor. Spring 16 has a spring constant which results in a substantial attachment force for the feeder, but which is capable of compression by a human operator.

Hook 22 in the preferred embodiment is curved in shape. Such a shape is easy to manufacture and is suitable for attaching the feeder to a floor of the type disclosed. As used herein, the term "hook" is not limited to curved shapes. Hook 22 could, for example, be L-shaped, comprising a single straight member (not shown) attached to the bottom of shaft 14 at an angle of 90° or less thereto. Also, such straight member may include an upwardly pointing protuberance at its distal end, in place of the end 42 of hook 22. A hook as used herein is a member which in one orientation will fit through apertures in a chosen animal pen floor and, in another orientation, controlled by the user, will engage solid portions of the floor.

Cleanable animal pen floors are well known and generally comprise solid portions to enable animal movement, and a plurality of apertures for cleaning purposes. The present invention is suitable for use with any such known flooring. The size of the hook used with the feeding apparatus should be selected so that the hook can pass through the apertures in the floor in at least one orientation. For example, if the floor includes square apertures, the hook may be inserted therethrough on the diagonal of the square and rotated to engage the solid aperture-defining parts of the floor.

While a preferred embodiment of the invention has been illustrated, it will be obvious to those skilled in the art that various modifications and changes may be made thereto without departing from the scope of the invention as defined in the claims.

What is claimed is:

1. An animal feeding apparatus for use on a floor comprising means for supporting animals having an aperture therein, the feeding apparatus comprising:
   an open, substantially concave reservoir for animal food having an outer edge defining a feeding perimeter, a side wall extending downwardly rom the perimeter to define a bottom and an aperture;
   a plurality of separator bars extending from the feeding perimeter over the concave reservoir defining a plurality of feeding positions along the perimeter; and
   floor engagement means for removably engaging the feeding apparatus to the floor at an edge of the aperture in the floor, said floor engagement means comprising a shaft disposed vertically through the aperture of the reservoir, the shaft terminating beneath the food reservoir in a hook and a spring means for urging the shaft and hook upward into removable engagement with the floor at the edge of the aperture in the floor.

2. An animal feeding apparatus in accordance with claim 1 wherein the separator bars are connected over the food reservoir to a shaft guide means for receiving and supporting an upper portion of the shaft.

3. An animal feeding apparatus in accordance with claim 2 wherein the shaft guide means comprises a hollow tube extending vertically from the connection with the separator bars through the aperture in the food reservoir for slidably and rotatably receiving the shaft.

4. An animal feeding apparatus in accordance with claim 3 comprising coil spring means surrounding the shaft above the shaft guide means and spring abutment means connected to the shaft for maintaining the coil spring means in tension between the shaft guide means and the abutment means.

5. An animal feeding apparatus in accordance with claim 4 wherein the hook has a transverse portion substantially normal to the shaft and the apparatus comprises indicator means attached to the shaft above the food reservoir for indicating the orientation of the transverse portion of the hook.

6. An animal feeding apparatus in accordance with claim 5 wherein the indicating means comprises a pointer attached to the shaft above the spring abutment means.

7. An animal feeding apparatus in accordance with claim 5 wherein the food reservoir is a substantially spherical section.

8. An animal feeding apparatus in accordance with claim 1 wherein the hook has a transverse portion substantially normal to the shaft and the apparatus comprises indicator means attached to the shaft above the food reservoir for indicating the orientation of the transverse portion of the hook.

9. An animal feeding arrangement comprising:
   an animal pen having a slotted pen floor comprising a plurality of floor support members separated by apertures;
   an open, substantially concave reservoir for animal food having an outer edge defining a feeding perimeter and a side wall extending downwardly from the perimeter to define a bottom;
   a hook means connected to and disposed beneath the reservoir;
   means operable from above the reservoir for extending the hook means through one of the apertures in the pen floor and for rotating the hook into engagement position with at least one of the floor support members; and
   means for maintaining engagement force between the hook means and the at least one floor support member after the hook means has been rotated to engagement position.

10. An animal feeding arrangement in accordance with claim 9 wherein the food reservoir comprises an aperture therethrough and the hook means comprises a shaft extending from beneath the reservoir through the aperture in the reservoir to a position above the reservoir.

11. An animal feeding arrangement in accordance with claim 9 wherein the force maintaining means comprises a spring.

12. An animal feeding arrangement in accordance with claim 11 wherein the separator bars are substantially evenly spaced around the perimeter of the food reservoir.

13. An animal feeding arrangement in accordance with claim 9 comprising shaft guide means for guiding the shaft above the reservoir, the guide means being supported by a plurality of separator bars connected between the perimeter of the food reservoir and the guide means.

* * * * *